(12) United States Patent
Kurono et al.

(10) Patent No.: US 8,928,522 B2
(45) Date of Patent: Jan. 6, 2015

(54) RADAR DEVICE

(75) Inventors: Yasuhiro Kurono, Kobe (JP); Kazuo Shirakawa, Kawasaki (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 546 days.

(21) Appl. No.: 13/289,631

(22) Filed: Nov. 4, 2011

(65) Prior Publication Data

US 2012/0112954 A1 May 10, 2012

(30) Foreign Application Priority Data

Nov. 10, 2010 (JP) ................................ 2010-252311

(51) Int. Cl.
| | |
|---|---|
| *G01S 13/58* | (2006.01) |
| *G01S 13/42* | (2006.01) |
| *G01S 3/74* | (2006.01) |
| G01S 13/93 | (2006.01) |
| G01S 13/02 | (2006.01) |

(52) U.S. Cl.
CPC . *G01S 13/42* (2013.01); *G01S 3/74* (2013.01); *G01S 13/931* (2013.01); *G01S 2013/0245* (2013.01)
USPC .............. 342/70; 342/107; 342/104; 342/147

(58) Field of Classification Search
CPC ..................................... G01S 3/74; G01S 3/46
USPC .................................... 342/70, 104, 107, 147
See application file for complete search history.

(56) References Cited

U.S. PATENT DOCUMENTS

| | | | |
|---|---|---|---|
| 5,892,700 A | 4/1999 | Haardt | |
| 2004/0189523 A1* | 9/2004 | Kishigami et al. | 342/417 |
| 2008/0039028 A1* | 2/2008 | Nishida et al. | 455/78 |
| 2008/0122681 A1* | 5/2008 | Shirakawa | 342/147 |
| 2008/0129596 A1* | 6/2008 | Xin | 342/378 |
| 2008/0297401 A1* | 12/2008 | Nishida | 342/147 |
| 2010/0090900 A1* | 4/2010 | Mitsumoto | 342/417 |

FOREIGN PATENT DOCUMENTS

| | | |
|---|---|---|
| CN | 1180413 A | 4/1998 |
| DE | 195 11 752 A1 | 10/1996 |
| JP | A-2009-210410 | 9/2009 |

OTHER PUBLICATIONS

Office Action issued in Chinese Patent Application No. 201110354121.2 dated Jun. 5, 2013 (with partial translation).
Pillai et al.; "Forward/Backward Spatial Smoothing Techniques for Coherent Signal Identification;" IEEE Transactions on Acoustics, Speech and Signal Processing; Jan. 1989, pp. 8-15; vol. 37, No. 1.
Mar. 29, 2012 Extended European Search Report issued in European Patent Application No. 11188395.5.
May 13, 2014 Office Action issued in Japanese Patent Application No. 2010-252311 (with English Translation).
Feb. 21, 2014 Office Action issued in Chinese Patent Application No. 201110354121.2 (with partial English Translation).

* cited by examiner

*Primary Examiner* — John B Sotomayor
*Assistant Examiner* — Marcus Windrich
(74) *Attorney, Agent, or Firm* — Oliff PLC

(57) ABSTRACT

The conventional ESPRIT method is accompanied by the problem of very long signal processing time. The radar device of the invention includes a signal vector-forming unit for forming signal vectors based on waves reflected from an object and received by using a plurality of receiving antennas; a submatrix-forming unit for forming submatrices based on the signal vectors; a regular matrix operation unit for calculating a regular matrix from the submatrices; an eigenvalue decomposition unit for calculating an eigenvalue of the regular matrix; and an angle calculation unit for calculating an angle at where the object is present from the eigenvalue.

5 Claims, 14 Drawing Sheets

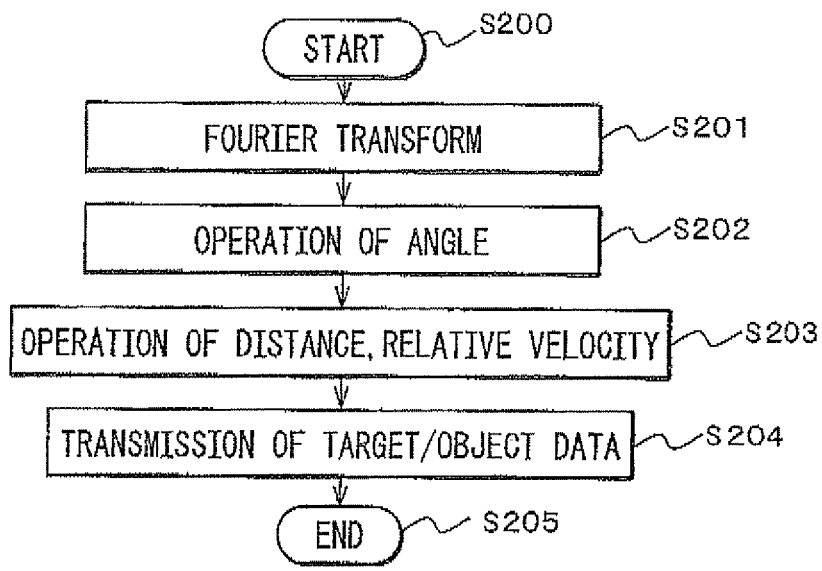
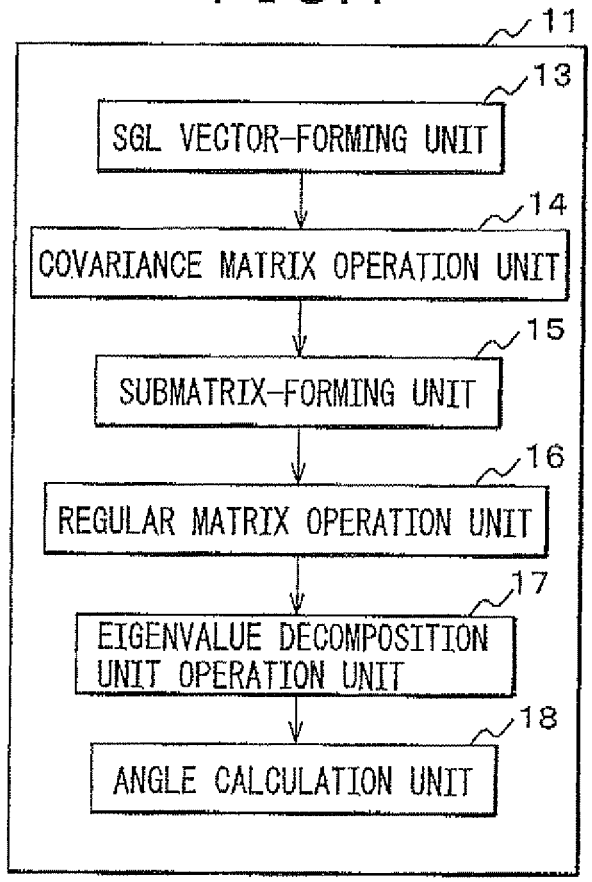

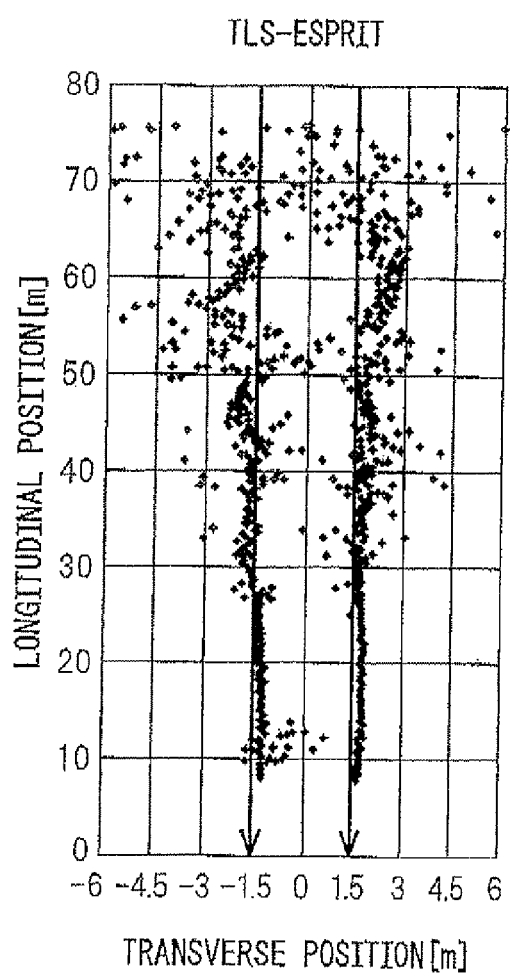 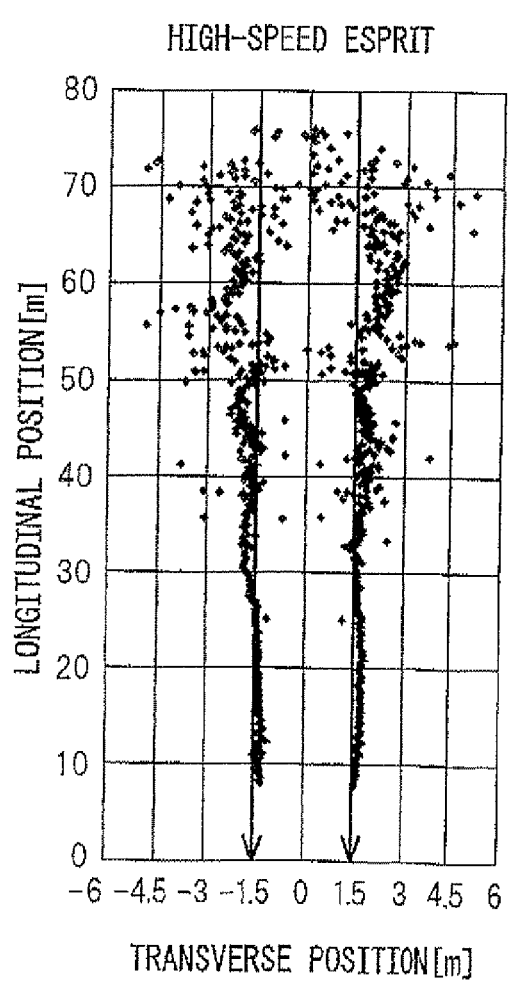
FIG.6A TLS-ESPRIT
FIG.6B HIGH-SPEED ESPRIT

RADAR DEVICE

CROSS REFERENCES TO RELATED DOCUMENTS

This application is a new U.S. patent application that claims benefit of JP-2010-252311, filed on Nov. 10, 2010, the content of 2010-252311 is incorporated herein by reference.

BACKGROUND OF THE INVENTION

1. Field of the Invention

This invention relates to a radar device and specifically, to a radar device which estimates angles of a plurality of waves coming from objects maintaining high resolution.

2. Description of Related Art

A radar device basically requires large amounts of calculation for the processing of estimating angles of objects based on a plurality of waves coming from the objects maintaining high resolution, i.e., requires large amounts of calculation fox "high-resolution processing". In addition, the higher resolution of angles is required, the more amount of signal processing is needed.

Among high-resolution processing methods, described below are relatively well-known processing methods in the order of decreasing resolution. The processing time, too, shortens in this order.
(1) ESPRIT> (2) MUSIC> (3) MINIMUM NORM METHOD> (4) LINEAR ESTIMATION METHOD> (5) CAPON METHOD> (6) DBF The term "ESPRIT" is an abbreviation for Estimation of Signal Parameters via Rotational Invariance Techniques. "MUSIC" is an abbreviation for MUltiple SIgnal Classification, and "DBF" is an abbreviation for Digital Beam Forming.

If attention is paid to processing times, the processing time greatly differs particularly between (1) and (2), and between (3) and (4). This is because in the methods (1) and (2), the signal covariance matrix should be processed by the eigenvalue decomposition. Specifically, in the ESPRIT method (1), a plurality of eigenvalue decomposition processing is required. FIG. 1 is a flowchart of how to process the signals in the ESPRIT method. For simple description hereinafter, it is presumed that the radar device is equipped with a uniformly spaced linear-array antenna in which receiving antennas of a number of L are arranged on a straight line maintaining an equal distance.

At step S101, first, the number of incoming waves is estimated. Next, at step S102, a sub-array constituted by the receiving antennas of a number of N is taken out from the receiving antennas of the number of L while shifting the phase reference point, and a spatial smoothing method is applied to the signals received by a group of these sub-arrays (reference documents: S. U. Pillai and B. H. Kwon, Forward/Backward Spatial Smoothing Techniques for Coherent Signal Identification, IEEE Trans. Acoust., Speech, Signal Processing, Vol. ASSP-37, pp. 8-15, January, 1989). Next, at step S103, the Nsth-dimensional correlation matrix is processed by the eigenvalue decomposition, and signal subspace vectors are picked up at step S104.

In the case of the LS (least square) method, a regular matrix $\Psi$ is calculated at step S105 relying on the method of least squares.

In the case of the TLS (total least square) method, on the other hand, the 2Nsth-dimensional expanded signal subspace matrix is processed by the eigenvalue decomposition at step S106. At step S107, a matrix of eigenvectors obtained at step S106 is formed. Next, at step S108, the regular matrix $\Psi$ is calculated from the matrix of eigenvectors.

After the regular matrix $\Psi$ is found by the LS method or the TLS method, eigenvalues of the Nsth-dimensional regular matrix $\Psi$ is calculated at step S109, and angles are calculated at step S110.

Here, Ns is the number of incoming waves estimated by the well-known AIC (Akaike's Information Criterion) etc., and becomes Ns=N−1 at the time of a maximum processing load.

Among the processings based on the ESPRIT method, the step having the greatest processing load is an eigenvalue decomposition, and the load of processing increase with an increase in the dimension of a matrix. The frequency of performing the eigenvalue decomposition according to the ESPRIT method varies depending upon the method of processing the regular matrix $\Psi$ appearing on the way of calculation, and is two times (steps S103 and S109) when the LS method is used and is three times (steps S103, S106 and S109) when the TLS method is used. According to the TLS method, in general, errors in the eigenvectors are minimized by using an expanded matrix and, therefore, a high degree of precision is attained through the frequency of performing the eigenvalue decomposition increases as compared to the LS method.

Prior to applying the ESPRIT method, it is normally necessary to estimate the number of incoming signals (or waves) by using eigenvalues of the covariance matrix (step S101—so, S101 requires a hidden eigenvalue decomposition, a OR-decomposition or the like). However, due to its poor precision it has been known that incorrect number often results. Further, the number of signals is estimated based on a trial-and-error-like calculation accounting for an increase in the processing time of the ESPRIT method.

In order to quicken the operation speed of the angle estimation processing, further, a method has been known for executing an object estimation processing by forming a pseudo-space smoothing covariance matrix and selecting from the formed matrix (e.g., patent document 1).

The problem that the invention is to solve is that a very long signal processing time is required by the ESPRIT method. Specifically, a car-mounted radar which must execute various processings inclusive of estimating the angles in very short periods of time is accompanied by a problem in that it is virtually difficult to estimate the angles relying on the conventional ESPRIT method.
[Patent document 1] JP-A-2009-210410

SUMMARY OF THE INVENTION

A radar device according to the invention comprises a signal vector-forming unit for forming signal vectors based on waves reflected from an object and received by using a plurality of receiving antennas; a covariance matrix operation unit for generating a signal covariance matrix; a submatrix-forming unit for extracting submatrices from the signal covariance matrix; a regular matrix operation unit for calculating a regular matrix from the submatrices; an eigenvalue decomposition unit for applying eigenvalue decomposition to the regular matrix; and an angle calculation unit for calculating an angle at where the object is present from the eigenvalue.

The radar device of the invention has an advantage that a single eigenvalue decomposition is required in the ESPRIT method and that the dimension of matrix that is to be processed one time is N−1, making it possible to suppress the processing time.

BRIEF DESCRIPTION OF THE DRAWINGS

These and other features and advantages of the preset invention will be better understood by reading the following detailed description, taken together with the drawings wherein:

FIG. 3 is a flowchart illustrating the procedure of signal processing in a signal processing unit;

FIG. 4 is a diagram illustrating the constitution of an angle detecting unit in the radar device according to the embodiment 1 of the invention;

FIG. 6A shows the results of calculating the angles according to a conventional TLS-ESPRIT method;

FIG. 6B shows the results of, calculating the angles by using the radar device of the present invention;

DETAILED DESCRIPTION OF THE PREFERRED EMBODIMENTS

The radar device according to the invention will now be described with reference to the drawings. It should, however, be noted that the technical scope of the invention is not limited by the embodiments thereof but also encompasses the inventions recited in the claims and equivalents thereof.

Embodiment 1

Figure 1:
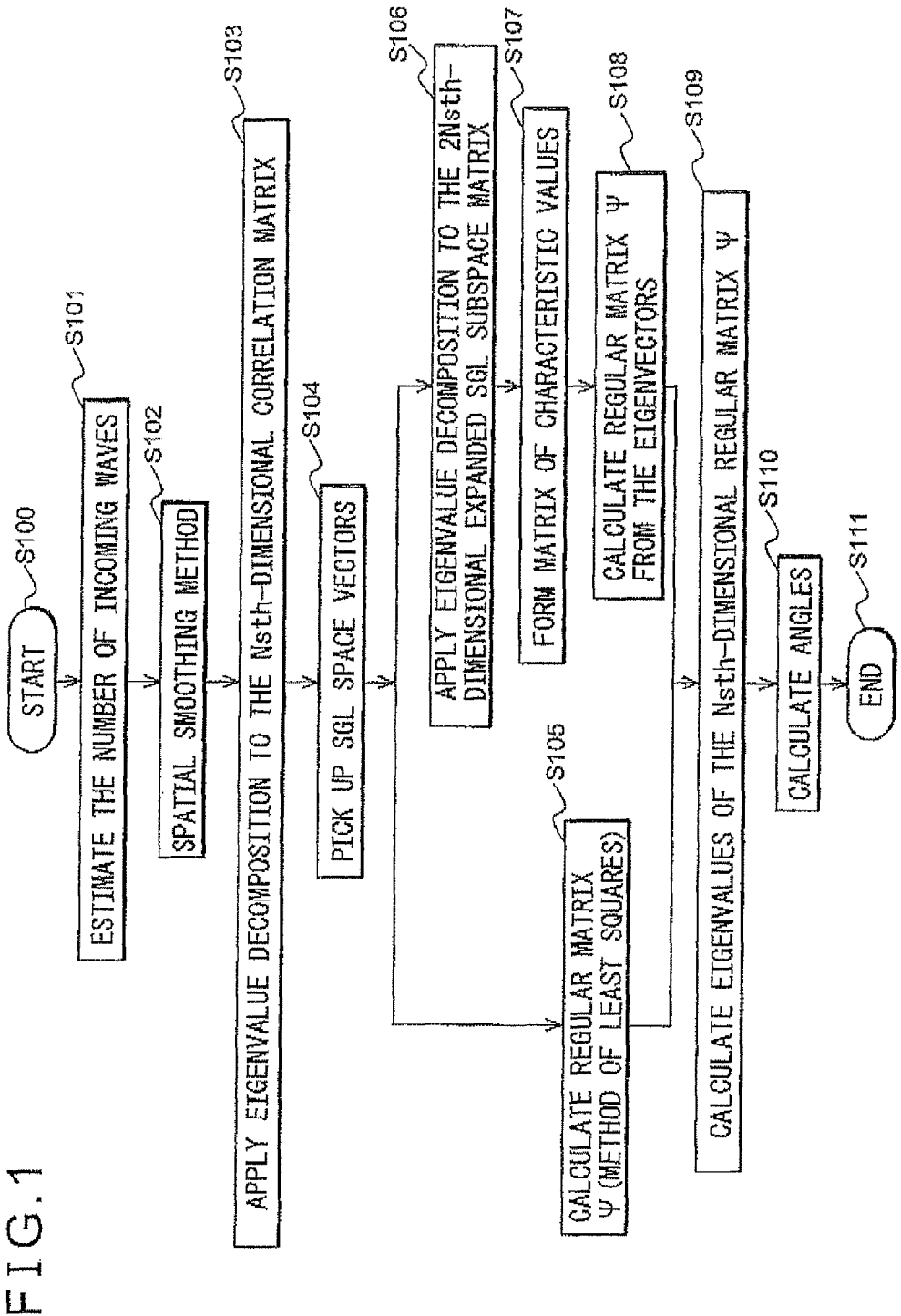
FIG. 1 is a flowchart of a signal processing method in the conventional ESPRIT method.
Figure 2:
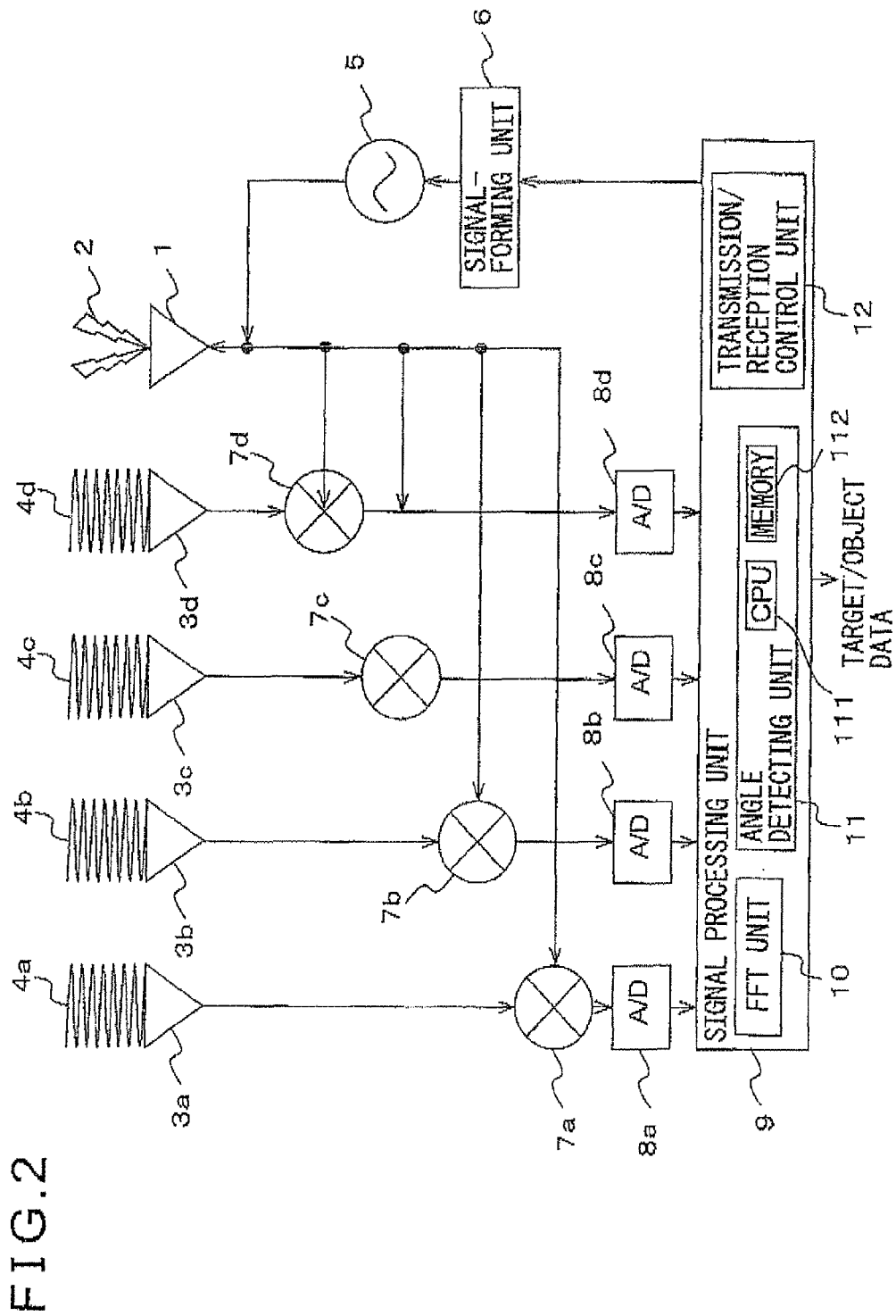
FIG. 2 is a diagram illustrating the constitution of a radar device according to an embodiment 1 of the invention.

First, a radar device according to an embodiment 1 of the present invention will be described with reference to the drawings. FIG. 2 is a diagram illustrating the constitution of the radar device according to the embodiment 1 of the invention. A signal-forming unit 6 is controlled by a transmission/reception control unit 12 in a signal processing unit 9, and desired modulation signals are output from the signal-forming unit 6. An oscillator 5 feeds transmission signals which are modulated based on the modulation signals, and electromagnetic waves 2 are transmitted from a transmission antenna 1. The transmission signals are reflected from an object or a target (not shown) and are received as reflected waves 4a to 4d by reception antennas 3a to 3d. The reception signals are mixed by mixers 7a to 7d with the transmission signals. Thereafter, the reception signals are converted into digital signals through A/D converters 8a to 8d, fed to the signal processing unit 9, processed by a Fast Fourier transform (FFT) unit 10, and the angle of the object is detected by an angle detecting unit 11. Here, the concrete number of transmission/reception antennas and the circuit constitution in the subsequent stage are merely one of many examples. The angle detecting unit 11 includes a CPU 111 for executing the signal processing method of the invention and a memory 112 storing program and data for executing the signal processing method.

Next, described below is a procedure for signal processing in the signal processing unit 9. FIG. 3 is a flowchart illustrating the procedure of signal processing in the signal processing unit 9. The reception signals fed to the signal processing unit 9 are subjected to the Fourier transform at step S201, and the angle of the object is calculated at step S202. The method of calculating the angle will be described later. The (relative) distance and (relative) velocity related to the angle information are calculated at step S203. At step S204, target/object data composed of its angle, distance and velocity are transmitted to a unit outside of the signal processing unit 9. The signal processing unit 9 is a program that is executed by an arithmetic unit such as a CPU (central processing unit) in a computer or is an entity on a storage unit thereof.

The radar device of the present invention has a feature in the constitution of the angle detecting unit 11. FIG. 4 illustrates the constitution of the angle detecting unit 11 in the radar device according to the embodiment 1 of the invention. The angle detecting unit 11 in the radar device of the invention includes a signal vector-forming unit 13, a covariance matrix operation unit 14, a submatrix-forming unit 15, a regular matrix operation unit 16, an eigenvalue decomposition unit 17 and an angle calculation unit 18.

The signal vector-forming unit 13 forms signal vectors based on the waves reflected from the object and received by using a plurality of reception antennas 4a to 4d. The covariance matrix operation unit 14 calculates a covariance matrix from the signal vectors. The submatrix-forming unit 15 forms submatrices from the covariance matrix. When there are many antennas, the covariance matrix may be suitably subjected to the spatial smoothing processing. When four reception antennas are used as in the following embodiments, the effect of spatial smoothing is small. If the spatial smoothing is not applied, therefore, the total number L of antennas constituting the reception array becomes equal to the number N of antennas constituting the sub-arrays. The regular matrix operation unit 16 calculates a regular matrix from the submatrices. The eigenvalue decomposition unit 17 calculates an eigenvalue of the regular matrix. Procedures of these operations will be described later. Finally, the angle calculation unit 18 calculates the angle from the eigenvalue.

Figure 5:
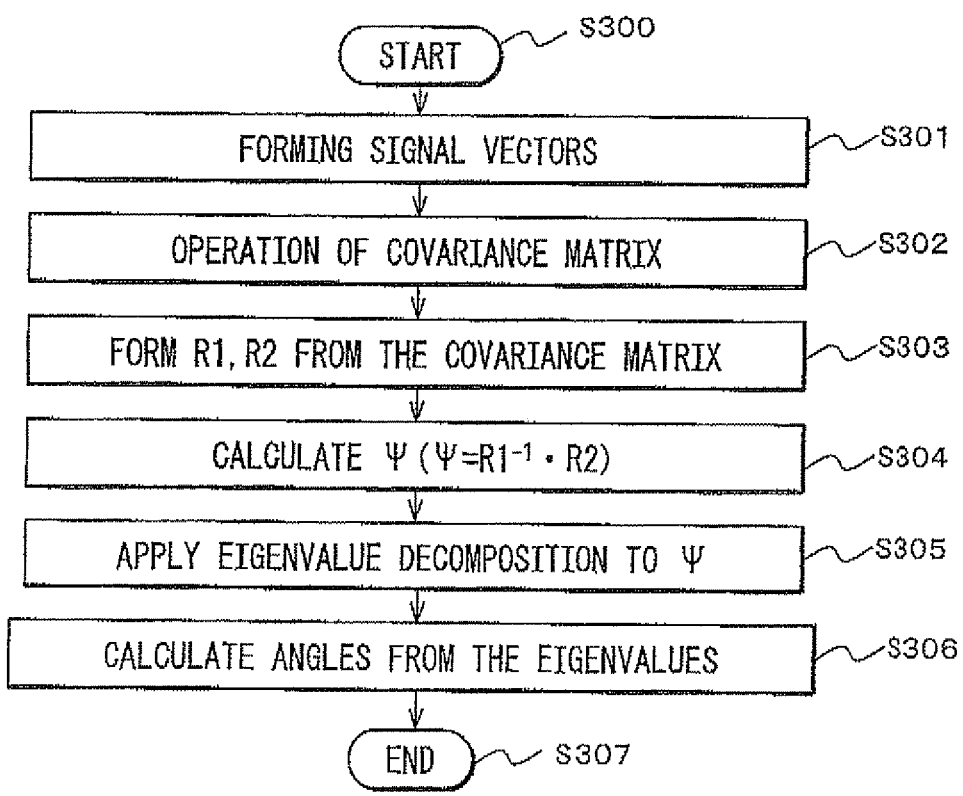
FIG. 5 is a flowchart illustrating the procedure of calculating the angles according to the embodiment 2 of the invention.

Next, described below is the method of calculating the angle in the radar device according to the embodiment 1 of the invention. FIG. 5 is a flowchart illustrating the procedure of calculating the angle according to the embodiment 1 of the invention. In the invention, column vectors in the covariance matrix are regarded to be the vectors spanning signal subspace. First, at step S301, the signal vector-forming unit 13 forms signal vectors based on the waves reflected from the object and received by the plurality of reception antennas 4a to 4d. Net at step S302, the covariance matrix operation unit 14 calculates a covariance matrix from the signal vectors. If there are four reception antennas, the covariance matrix R is expressed as the following matrix of dimension 4 by 4. Generally, the covariance matrix is subjected to an ensemble (or time) averaging processing E [ ] to suppress noise when the reception signals are not subjected to the Fourier transform at step S201, which, however, is not described here to simplify the description of algorithm of the invention.

$$R = \begin{pmatrix} \begin{bmatrix} r11 & r12 & r13 \\ r21 & r22 & r23 \\ r31 & r32 & r33 \end{bmatrix} & \begin{matrix} r14 \\ r24 \\ r34 \end{matrix} \\ \begin{matrix} r41 & r42 & r43 \end{matrix} & r44 \end{pmatrix} \quad (1)$$

The number of column vectors constituting the matrix serves as a number of targets for outputting the angle and is, here, N−1=4−1=3. Next, at step S303, an N×(N−1) submatrix surrounded by a square frame is picked up from the above covariance matrix, and the following two (N−1)th-dimensional submatrices R1, R2 are formed from the above submatrix. The formation processing will be described later.

$$R1 = \begin{pmatrix} r11 & r12 & r13 \\ r21 & r22 & r23 \\ r31 & r32 & r33 \end{pmatrix}, R2 = \begin{pmatrix} r21 & r22 & r23 \\ r31 & r32 & r33 \\ r41 & r42 & r43 \end{pmatrix} \quad (2)$$

Next, at step S304, a regular matrix $\Psi$ is calculated. Since R1 is an positive-definite Hermitian matrix, presence of an inverse matrix can be assumed. If the number of columns of the matrix picked up from the covariance matrix is less than N−1, then R1 fails to become a square matrix. Therefore, no inverse matrix is present, and a pseudo-inverse matrix must be calculated. The regular matrix $\Psi$ is found from an equation R2=R1·$\Psi$. Since it has been known that the inverse matrix of R1 is present, the regular matrix $\Psi$ can be directly calculated using submatrices R1, R2 as $\Psi$=R1$^{-1}$·R2.

After the regular matrix $\Psi$ is calculated, an eigenvalue is calculated at step S305 by applying the eigenvalue decomposition to $\Psi$ in the same manner as the conventional ESPRIT method. Next, at step S306, the angle is calculated from the phase of the eigenvalue. Only those eigenvalues close to 1 are regarded to be values corresponding to the targets that are to be detected, and the angles are calculated therefrom.

For reference, the processing time of the radar device of the invention is shown below together with the processing times of the conventional radar devices.

TABLE 1

| Processing method | Processing time (clocks) |
|---|---|
| This invention (high-speed ESPRIT) | 7289 |
| LS-ESPRIT | 20771 |
| TLS-ESPRIT | 45203 |
| DBF | 10428 |

As described above, according to the high-speed ESPRIT method which is the signal processing method of the present invention, the signal processing time is about 70 percent that of the DBF.

The processing time of the invention tabulated above is when a QR method is used for calculating the eigenvalue. When the dimension of regular matrix $\Psi$ is small, it is considered that the speed can be further increased if the eigenvalue is found by employing a method of directly solving characteristic equations.

Next, the angle separating capability will be described. FIG. 6A shows the results of calculating the angles according to a conventional. MS-ESPRIT method and FIG. 6B shows the results of calculating the angles by using the radar device of the present invention. FIGS. 6A and 6B are graphs plotting relative positions (longitudinal positions) of the targets in the longitudinal direction and relative positions (transverse positions) of the targets in the transverse direction by measuring the two targets that are approaching in the direction of arrows in the drawings. The axis of ordinate and the axis of abscissa represent longitudinal positions and transverse positions with the position of the radar device as an origin. According to the high-speed ESPRIT method of the present invention as will be learned from FIGS. 6A and 6B, there is almost no difference in the separation capability despite the load of calculation is greatly decreased as compared to the conventional TLS-ESPRIT.

The method of calculating the angle according to the invention has a difference as described below from the conventional methods concerning the precision for estimating the angle. That is, since the regular matrix is directly calculated from the covariance matrix itself, noise components contained in the received signals become as components in the signal subspaces. Therefore, if compared to the method of forming the regular matrix using the eigenvectors only which span the signal subspace obtained by applying the eigenvalue decomposition to the covariance matrix (i.e., the effect of noise components has almost been removed), it is considered that the precision of estimation according to the method of calculating the angle of the present invention decreases if the signal-to-noise ratio decreases. In the use of the radars where the data are measured less frequently (number of snap shots is small), however, noise cannot be sufficiently suppressed. Therefore, the above disadvantage does not become much of a problem.

As will be obvious from the above description and the process flow of the invention, the present invention requires only one time eigenvalue decomposition and in this one time of processing, the matrix to be decomposed is the (N−1)th-dimensional one, from which it will be learned that the processing time can be greatly shortened. This is due to the following two reasons.

First, since the regular matrix $\Psi$ is directly calculated from submatrices of the covariance matrix, there is no step of eigenvalue decomposition to find eigenvectors spanning the signal subspace. On the other hand, the conventional methods apply the eigenvalue decomposition to the covariance matrix and obtain eigenvectors (which span signal subspace) corresponding to the eigenvalue of not smaller than a predetermined magnitude and, further, the LS/TLS method was applied thereto to form the regular matrix.

Second, the calculation is conducted assuming that the number of incoming signals (number of targets to be detected) is always N−1 and, hence, the process for estimating the number of signals is omitted. On the other hand, the number of signals should be estimated using a statistic index such as AIC (Akaike information criterion) or MDL (minimum description length principle) for the eigenvalue obtained by applying the eigenvalue decomposition to the covariance matrix.

According to the high-speed ESPRIT method of the present invention which conducts the calculation assuming that the number of signals is N−1 from the first time, however as a consequence, an output in which there are N−1 signals at all times is obtained (concretely, angles of N−1 signals). Therefore, if the actual number of signals is, in practice, less than N−1, a false angle is output. Accordingly, there may be added a processing for verifying the reliability of angles. Concrete processing methods will be described later. Here, N−1 which is the number of the angle outputs can be varied to a number less than N−1 depending upon how to form Ψ.

Next, described below are the reasons why the matrix composed of eigenvectors representing signal subspace can be replaced by submatrices of the covariance matrix as in this embodiment. The number of channels of the received signals (number of antennas: N) is assumed to be 4 channels (ch) and the number of incoming waves is assumed to be 3 (=N−1).

First, symbols used in the following description are defined as follows:

$y_m$: received signal of the m-th channel (m=1 to 4)

$n_m$: noise of the m-th channel (m=1 to 4)

$x_k$: received signal of the k-th incoming wave of channel 1 (k=1 to 3)

$\phi_k$: spatial phase of the k-tip incoming wave (k=1 to 3)

If the incoming angle of a signal is denoted by $\theta_k$, the wavelength of a center frequency (carrier frequency) of signals formed by the oscillator by $\lambda$, the distance between antennas of the uniform linear array reception antenna by d, and pi by $\pi$, then, $$\phi_k = 2 \cdot \pi \cdot (d/\lambda) \cdot \sin(\theta_k)$$

exp(u): exponential function of a Napier's number with u as a variable j: imaginary unit ($j^2 = -1$)

Based on the above definitions, the vector Y composed of received signals $y_m$ can now be expressed as described below. The signals may be processed in either the time region (variable: t) or the frequency region (variable: f) and, therefore, processing regions for signals are not specifically stated like y(t), y(f).

$$Y = \begin{pmatrix} y_1 \\ y_2 \\ y_3 \\ y_4 \end{pmatrix} = \quad (3)$$

$$Ax + N = \begin{pmatrix} 1 & 1 & 1 \\ \exp(j\phi_1) & \exp(j\phi_2) & \exp(j\phi_3) \\ \exp(j2\phi_1) & \exp(j2\phi_2) & \exp(j2\phi_3) \\ \exp(j3\phi_1) & \exp(j3\phi_2) & \exp(j3\phi_3) \end{pmatrix} \begin{pmatrix} x_1 \\ x_2 \\ x_3 \end{pmatrix} + \begin{pmatrix} n_1 \\ n_2 \\ n_3 \\ n_4 \end{pmatrix}$$

$$Ai = \begin{pmatrix} 1 & 1 & 1 \\ \exp(j\phi_1) & \exp(j\phi_2) & \exp(j\phi_3) \\ \exp(j2\phi_1) & \exp(j2\phi_2) & \exp(j2\phi_3) \\ \exp(j3\phi_1) & \exp(j3\phi_2) & \exp(j3\phi_3) \end{pmatrix}$$

where A is called an array response matrix denoting special phase of incoming signals.

Here, $J_1$ and $J_2$ are defined as follows:

$$J_1 = \begin{pmatrix} 1 & 0 & 0 & 0 \\ 0 & 1 & 0 & 0 \\ 0 & 0 & 1 & 0 \end{pmatrix}, J_2 = \begin{pmatrix} 0 & 1 & 0 & 0 \\ 0 & 0 & 1 & 0 \\ 0 & 0 & 0 & 1 \end{pmatrix} \quad (4)$$

Here, if $Y_1 = J_1 \cdot Y$ and $Y_2 = J_2 \cdot Y$, then $Y_1$ and $Y_2$ are given by the following formulas.

$$Y_1 = J_1 Y = \begin{pmatrix} y_1 \\ y_2 \\ y_3 \end{pmatrix} = J_1(Ax + N) = J_1 Ax + J_1 N \quad (5)$$

$$Y_2 = J_2 Y = \begin{pmatrix} y_2 \\ y_3 \\ y_4 \end{pmatrix} = J_2(Ax + N) = J_2 Ax + J_2 N$$

Further, $\Phi$, $I_3$ and $K_3$ are defined as follows:

$$\Phi = \begin{pmatrix} \exp(j\phi_1) & 0 & 0 \\ 0 & \exp(j\phi_2) & 0 \\ 0 & 0 & \exp(j\phi_3) \end{pmatrix}, \quad (6)$$

$$I_3 = \begin{pmatrix} 1 & 0 & 0 \\ 0 & 1 & 0 \\ 0 & 0 & 1 \end{pmatrix}, K_3 = \begin{pmatrix} 0 & 1 & 0 \\ 0 & 0 & 1 \\ 0 & 0 & 0 \end{pmatrix}$$

Then $R_1$ and $R_2$ can be expressed as described below, where $\sigma^2$ is a mean noise power, and $R_{xx}$ is a covariance matrix of x, i.e., $E[xx^H]$.

$$R_1 = Y_1 Y_1^H = (J_1 Ax + J_1 N)(J_1 Ax + J_1 N)^H = J_1 A R_{xx}(J_1 A)^H + \sigma^2 I_3$$

$$R_2 = Y_2 Y_1^H = (J_2 Ax + J_2 N)(J_1 Ax + J_1 N)^H = (J_1 A \Phi) R_{xx} (J_1 A)^H + \sigma^2 K_3 \quad (7)$$

Here, $J_1 A$ is decomposed with QR, where Q is a unitary matrix and R is an upper triangular matrix. Attention, however, should be given to that R that appears during the proof thereof is not the R of the formula 1. Further, if noise components $\sigma^2 I_3$, $\sigma^2 K_3$ are neglected for simplicity, the dimension of R, too, becomes of the N−1 since the number of signals has been assumed to be N−1, and there, further, exists an inverse matrix. By taking the above into consideration, $R_1$ and $R_2$ can be expressed as follows:

$$R_1 = (J_1 A) R_{xx} (J_1 A)^H = QRR_{xx} Q^H R^H$$

$$R_2 = (J_1 A \Phi) R_{xx} (J_1 A)^H = QR\Phi R_{xx} Q^H R^H \quad (8)$$

Therefore, the regular matrix Ψ including rotational invariance features can be expressed as, $$\Psi = R_1^{-1} R_2 \quad (9)$$

$$= (QRR_{xx} R^H Q^H)^{-1} (QR\Phi R_{xx} R^H Q^H)$$

$$= (Q(R^H)^{-1} R_{xx}^{-1} R^{-1} Q^H) \quad \because Q: \text{unitary matrix } (Q^{-1} = Q^H)$$

$$(QR\Phi R_{xx} R^H Q^H)$$

$$= Q(R^H)^{-1} R_{xx}^{-1} R^{-1} R\Phi R_{xx} R^H Q^H \quad \because Q: \text{unitary matrix } (Q^H Q = I)$$

-continued $$= Q(R^H)^{-1} R_{xx}^{-1} \Phi R_{xx} R^H Q^H$$

$$= (R_{xx} R^H Q^H)^{-1} \Phi R_{xx} R^H Q^H$$

Here, T is expressed as described below and is presumed to be a regular matrix.

$$T = R_{xx} R^H Q^H \quad (10)$$

Then $\Psi$ can be regarded to be a similarity transformation of $\Phi$ as given by the following formula.

$$\Psi = T^{-1} \Phi T \quad (11)$$

As described above, an approximated matrix of a regular matrix in the ESPRIT method can be found directly from the submatrices of the covariance matrix.

Embodiment 2

Figure 7:
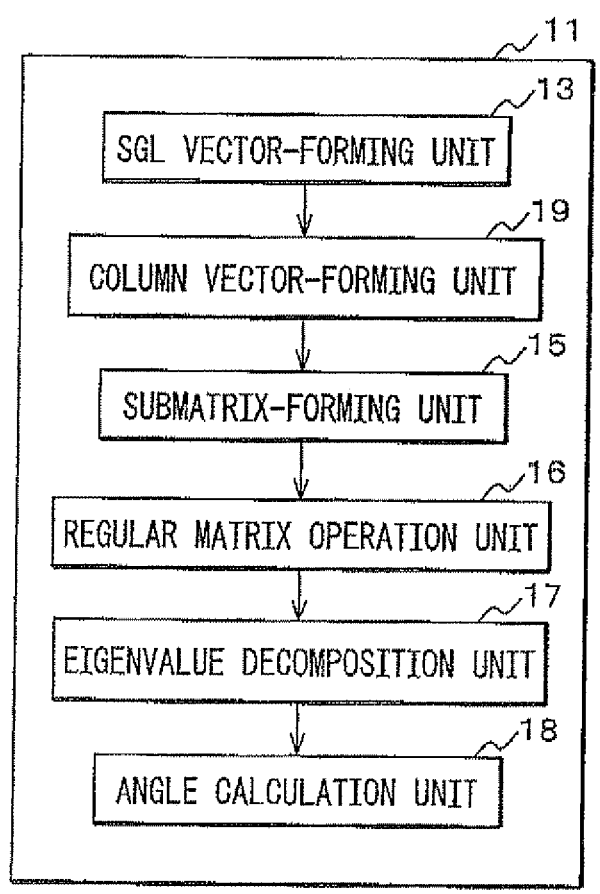
FIG. 7 is a diagram illustrating the constitution of the angle detecting unit in the radar device according to an embodiment 2 of the invention.

Next, the radar device according to an embodiment 2 of the invention will be described with reference to the drawings. FIG. 7 illustrates the constitution of the angle detecting unit in the radar device according to the embodiment 2 of the invention. The constitution of the radar device of the embodiment 2 in other respects is the same as that of the embodiment 1, and is not described in detail.

The radar device of the present invention has a feature in the constitution of the angle detecting unit 11. What makes a difference from the angle detecting unit in the radar device of the embodiment 1 is that a column vector-forming unit 19 is provided instead of the covariance matrix operation unit 14.

Figure 8:
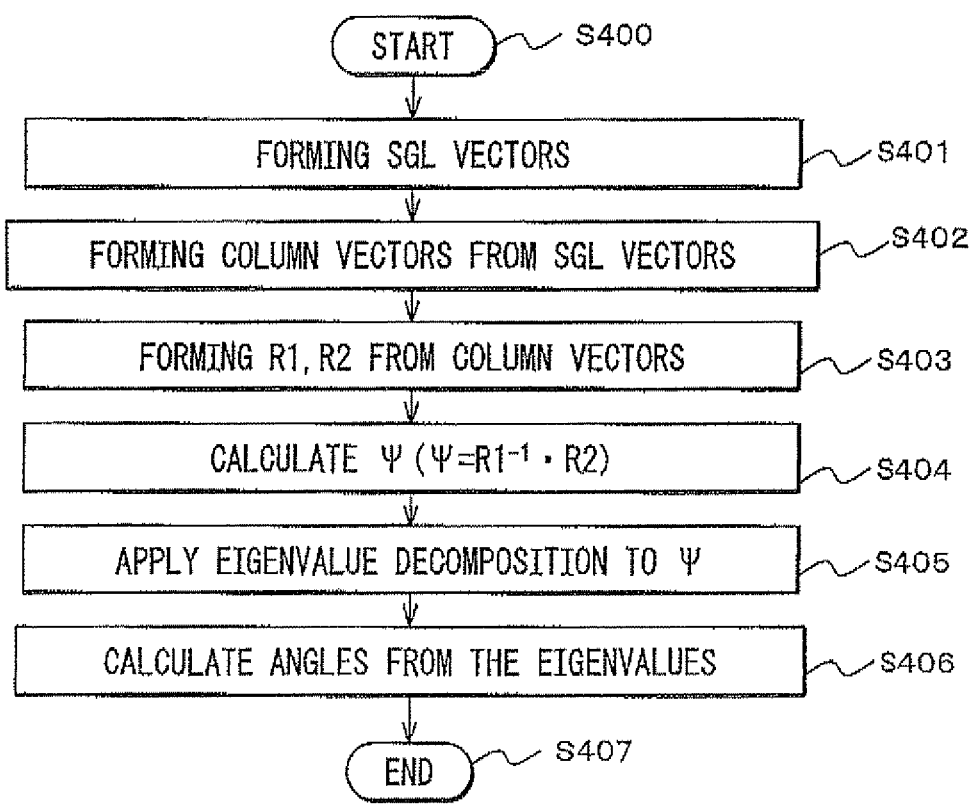
FIG. 8 is a flowchart illustrating the procedure of calculating the angles according to the embodiment 2 of the invention.

Next, described below is the method of calculating the angle in the radar device according to the embodiment 2 of the invention. FIG. 8 is a flowchart illustrating the procedure of calculating the angles according to the embodiment 2 of the invention. In the invention, the data vectors are linearly independent when they are measured by using the transmission antennas having dissimilar transmission beam patterns (in the following example, it is assumed that 2 transmission antennas are used), and are assumed to be in common concerning the array response matrix.

First, at step S401, like in the embodiment 1, the signal vector-forming unit 13 forms signal vectors based on the waves reflected from the objects and received by the plurality of reception antennas 4a to 4d, Next, at step S402, the column vector-forming unit 19 forms column vectors. The column vectors are arranged as a matrix Y (though it will be called the vectors) as follows:

$$Y = \begin{bmatrix} y_1^1 & y_1^2 \\ y_2^1 & y_2^2 \\ y_3^1 & y_3^2 \\ y_4^1 & y_4^2 \end{bmatrix} \quad (12)$$

$$= A[x^1 \ x^2] + N$$

$$= \begin{bmatrix} 1 & 1 \\ \exp(j\phi_1) & \exp(j\phi_2) \\ \exp(j2\phi_1) & \exp(j2\phi_2) \\ \exp(j3\phi_1) & \exp(j3\phi_2) \end{bmatrix} \begin{bmatrix} x_1^1 & x_1^2 \\ x_2^1 & x_2^2 \end{bmatrix} + \begin{bmatrix} n_1^1 & n_1^2 \\ n_2^1 & n_2^2 \\ n_3^1 & n_3^2 \\ n_4^1 & n_4^2 \end{bmatrix},$$

where $y_m^1$ and $y_m^2$ are received signals at the m-th channel corresponding to the transmission antennas 1 and 2 having different beam patterns.

Next, at step S403, submatrices R1 and R2 are extracted from the column vectors Y. Here, for simplicity, noise components are neglected like in the embodiment 1.

$$R_1 = \begin{bmatrix} y_1^1 & y_1^2 \\ y_2^1 & y_2^2 \end{bmatrix} = \begin{bmatrix} 1 & 1 \\ \exp(j\phi_1) & \exp(j\phi_2) \end{bmatrix} \begin{bmatrix} x_1^1 & x_1^2 \\ x_2^1 & x_2^2 \end{bmatrix} \quad (13)$$

$$R_2 = \begin{bmatrix} y_2^1 & y_2^2 \\ y_3^1 & y_3^2 \end{bmatrix} = \begin{bmatrix} \exp(j\phi_1) & \exp(j\phi_2) \\ \exp(j2\phi_1) & \exp(j2\phi_2) \end{bmatrix} \begin{bmatrix} x_1^1 & x_1^2 \\ x_2^1 & x_2^2 \end{bmatrix}$$

Next, a regular matrix $\Psi$ is calculated at step S404. Like in the embodiment 1, the regular matrix $\Psi$ can be directly calculated as $\Psi = R_1^{-1} \cdot R_2$.

$$\Psi = R_1^{-1} R_2 = \begin{bmatrix} x_1^1 & x_1^2 \\ x_2^1 & x_2^2 \end{bmatrix}^{-1} \begin{bmatrix} 1 & 1 \\ \exp(j\phi_1) & \exp(j\phi_2) \end{bmatrix}^{-1} \quad (14)$$

$$\begin{bmatrix} \exp(j\phi_1) & \exp(j\phi_2) \\ \exp(j2\phi_1) & \exp(j2\phi_2) \end{bmatrix} \begin{bmatrix} x_1^1 & x_1^2 \\ x_2^1 & x_2^2 \end{bmatrix}$$

$$= \begin{bmatrix} x_1^1 & x_1^2 \\ x_2^1 & x_2^2 \end{bmatrix}^{-1} \frac{1}{\exp(j\phi_2) - \exp(j\phi_1)} \begin{bmatrix} \exp(j\phi_2) & -1 \\ -\exp(j\phi_1) & 1 \end{bmatrix}$$

$$\begin{bmatrix} \exp(j\phi_1) & \exp(j\phi_2) \\ \exp(j2\phi_1) & \exp(j2\phi_2) \end{bmatrix} \begin{bmatrix} x_1^1 & x_1^2 \\ x_2^1 & x_2^2 \end{bmatrix}$$

$$= \begin{bmatrix} x_1^1 & x_1^2 \\ x_2^1 & x_2^2 \end{bmatrix}^{-1} \begin{bmatrix} \exp(j\phi_1) & 0 \\ 0 & \exp(j\phi_2) \end{bmatrix} \begin{bmatrix} x_1^1 & x_1^2 \\ x_2^1 & x_2^2 \end{bmatrix}$$

Upon constituting the data matrix as described above, the diagonal components obtained by applying eigenvalue decomposition to $\Psi$ and they become equivalent to those of the ESPRIT method. That is, in the general ESPRIT method, a transformation matrix T for projecting an array response matrix into signal subspace corresponds to a matrix constituted by base band vectors. After the regular matrix $\Psi$ is calculated, the eigenvalue is calculated by applying eigenvalue decomposition to $\Psi$ in the same manner as the conventional ESPRIT method. Next, at step S406, an angle is calculated from the phase of the eigenvalue. Only those eigenvalues of magnitudes close to 1 are picked up to calculate true angles.

Embodiment 3

Figure 9:
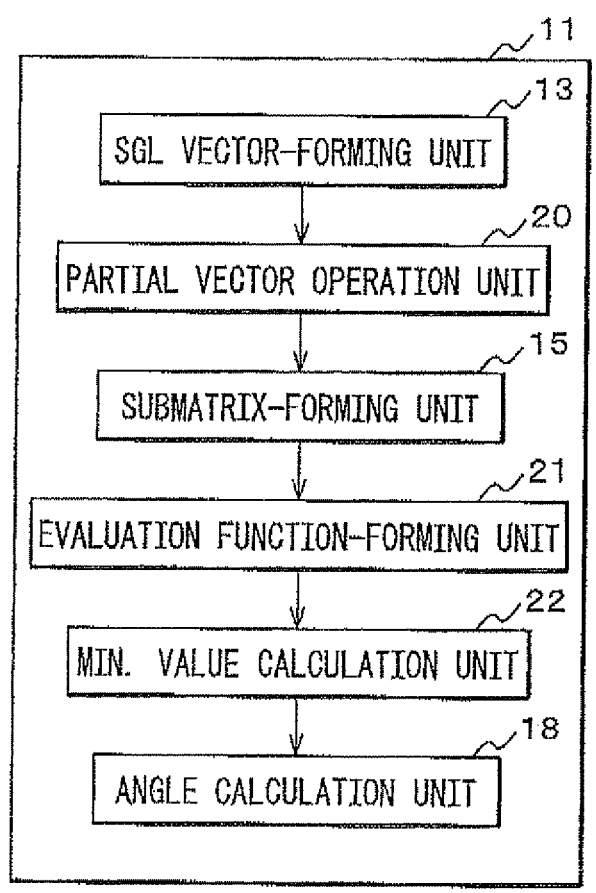
FIG. 9 is a diagram illustrating the constitution of the angle detecting unit in the radar device according to an embodiment 3 of the invention.

Next, the radar device according to an embodiment 3 of the invention will be described with reference to the drawings. FIG. 9 illustrates the constitution of the angle detecting unit in the radar device according to the embodiment 3 of the invention. The constitution of the radar device of the embodiment 3 in other respects is the same as that of the embodiment 1, and is not described in detail.

The radar device of the present invention has a feature in the constitution of the angle detecting unit 11. What makes a difference from the angle detecting unit in the radar device of the embodiment 1 is that a partial vector operation unit 20 is provided instead of the covariance matrix operation unit 14, an evaluation function-forming unit 21 is provided instead of the regular matrix operation unit 16, and a minimum value calculation unit 22 is provided instead of the eigenvalue decomposition unit 17.

Figure 10:
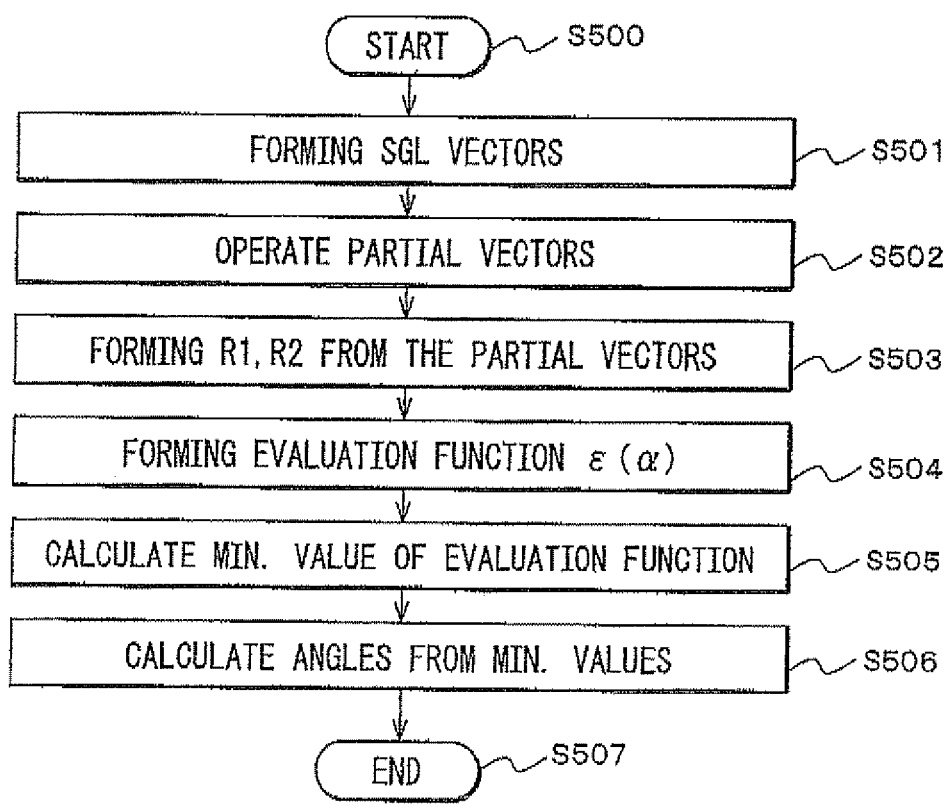
FIG. 10 is a flowchart illustrating the procedure of calculating the angles according to the embodiment 3 of the invention.

Next, described below is the method of calculating the angle in the radar device according to the embodiment 3 of the invention. FIG. 10 is a flowchart illustrating the procedure of calculating the angle according to the embodiment 3 of the invention. First, at step S501, like in the embodiment 1, the signal vector-forming unit 13 forms signal vectors based on the waves reflected from the objects and received by the plurality of reception antennas 4a to 4d. Next, at step S502, the partial vector operation unit 20 picks up partial vectors $y_1$, $y_2$ that satisfy the rotational invariance from the data y like in the ordinary ESPRIT method.

$$y_1 = J_1 y = [y_1 y_2 y_3]^T = J_1(Ax+n) = J_1 Ax + J_1 n$$

$$y_2 = J_2 y = [y_2 y_3 y_4]^T = J_2(Ax+n) = J_2 Ax + J_2 n \quad (15)$$

Next, at step S503, submatrices $R_1$, $R_2$ are calculated by using the partial vectors $y_1$, $y_2$.

$$R_1 = y_1 y_1^H = (J_1 Ax + J_1 n)(J_1 Ax + J_1 n)^H = J_1 A R_{xx}(J_1 A)^H + \sigma^2 I_3$$

$$R_2 = y_1 y_2^H = (J_1 Ax + J_1 n)(J_2 Ax + J_2 n)^H = J_1 A R_{xx} \Phi^H (J_1 A)^H + \sigma^2 K_3 \quad (16)$$

where $K_3$ is a matrix in which, as shown below, the first upper sub-diagonal components are 1s and other components are 0s.

$$K_3 = \begin{pmatrix} 0 & 1 & 0 \\ 0 & 0 & 1 \\ 0 & 0 & 0 \end{pmatrix} \quad (17)$$

Next, at step S504, the following evaluation function $\epsilon(\alpha)$ is formed.

$$\epsilon(\alpha) = \|R_1 - \alpha R_2\|^2 = \|(J_1 A) R_{xx}(I_3 - \alpha \Phi^H)(J_1 A)^H + \sigma^2(I_3 - \alpha K_3)\|^2 \quad (18)$$

It is assumed that the SNR (signal-to-noise ratio) is sufficiently large. That is, in the Eq. 18, it is assumed that the magnitudes of the second terms (noise components in $R_1$ and $R_2$) are very smaller than the first terms (signal components in $R_1$, and $R_2$) and that the second terms are negligible. Next, at step S505, if the above formula is solved as an equation related to $\alpha$, the evaluation function becomes a minimum when $\alpha = \exp(j\phi)$ and, therefore, a minimum value of the evaluation function at this moment is calculated. Next, at step S506, the angle is calculated from the minimum value. If the number of signals is assumed to be 3, the rank of matrix $(I_3 - \alpha \phi^H)$ is also 3. Therefore, there are three solutions $\alpha$s.

Next, described below is how to verify the reliability of the angle that is calculated. According to the high-speed ESPRIT method of the present invention, the calculation is conducted assuming that the number of signals is N−1 and, therefore, there are always obtained such outputs that there are N−1 signals of necessarily. Therefore if the real number of signals is less than N−1, then there is produced an angle based upon false signals without corresponding signals. It is, therefore, desired to add a processing for verifying the reliability of angles.

The reliability of angles can be validated depending on the magnitudes of the eigenvalues. That is, when the calculated angle is a true value, the magnitude of the eigenvalue is approximately 1. Concerning an undesired peak (peak at an angle at which no object is really present), however, the magnitude of the eigenvalue basically takes a value which is not 1. The reason will now be described. The array response matrix A of signals is expressed as, $$A = \begin{pmatrix} 1 & 1 & 1 \\ \exp(j\phi_1) & \exp(j\phi_2) & \exp(j\phi_3) \\ \exp(j2\phi_1) & \exp(j2\phi_2) & \exp(j2\phi_3) \\ \exp(j3\phi_1) & \exp(j3\phi_2) & \exp(j3\phi_3) \end{pmatrix} : \text{array response matrix} \quad (19)$$

Next, submatrices $A_1$, $A_2$ are picked up from the matrix A.

$$A_1 = \begin{pmatrix} 1 & 1 & 1 \\ \exp(j\phi_1) & \exp(j\phi_2) & \exp(j\phi_3) \\ \exp(j2\phi_1) & \exp(j2\phi_2) & \exp(j2\phi_3) \end{pmatrix}, \quad (20)$$

$$A_2 = \begin{pmatrix} \exp(j\phi_1) & \exp(j\phi_2) & \exp(j\phi_3) \\ \exp(j2\phi_1) & \exp(j2\phi_2) & \exp(j2\phi_3) \\ \exp(j3\phi_1) & \exp(j3\phi_2) & \exp(j3\phi_3) \end{pmatrix}$$

Here, $\Phi$ is defined as follows:

$$\Phi = \begin{pmatrix} \exp(j\phi_1) & 0 & 0 \\ 0 & \exp(j\phi_2) & 0 \\ 0 & 0 & \exp(j\phi_3) \end{pmatrix} \quad (21)$$

Then, $A_1 \cdot \Phi = A_2$ holds. Therefore, the eigenvalue found by the ESPRIT method is $\exp(j\phi_n)$ (n=1, 2, 3). The eigenvalue serves as a phase change quantity necessary for matching the signals in the two channel groups that are picked up at first.

Figure 11:
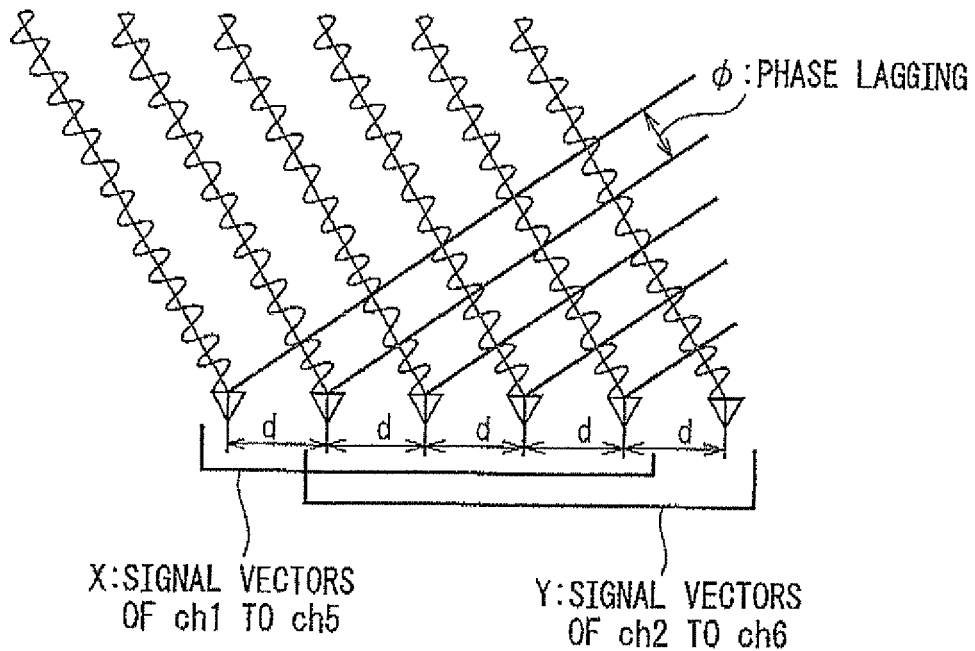
FIG. 11 is a diagram showing intensities of incoming signals of when the eigenvalue is 1.

FIG. 11 shows intensities of the incoming signals of when the eigenvalue is 1. It is assumed that L=N=6. The signal vectors of ch1 to ch5 are denoted by X, and signal vectors of ch2 to ch6 are denoted by Y. Concerning the incoming waves corresponding to the eigenvalue $\exp(j\phi_n)$ (n=1, 2, 3), therefore, X multiplied by the eigenvalue $\exp(j\phi_n)$ (n=1, 2, 3) accords with Y.

Figure 12:
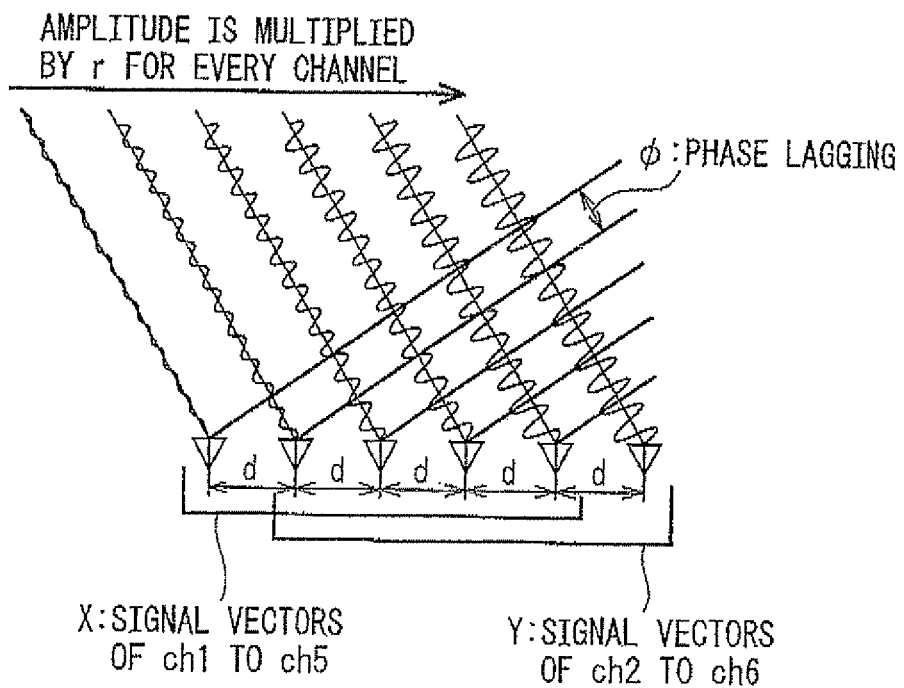
FIG. 12 is a diagram showing intensities of incoming signals of when the eigenvalue is not 1.

On the other hand, if the magnitude of the eigenvalue is not 1, i.e., if the eigenvalue is $r_n \cdot \exp(j\phi_n)$ (n=1, 2, 3) ($r_n$ is not 1), the amplitude is multiplied by r (n is omitted) for every channel as shown in FIG. 12. Theoretically, such incoming waves are never input, and corresponding signals do not really exist. It is, therefore, judged that the angle is false.

Embodiment 4

Next, the radar device according to an embodiment 4 of the invention will be described. The radar device of the embodiment 4 has a feature on the provision of an angle reliability evaluation unit for verifying the reliability of angle relying upon the magnitude of the eigenvalue.

Figure 13:
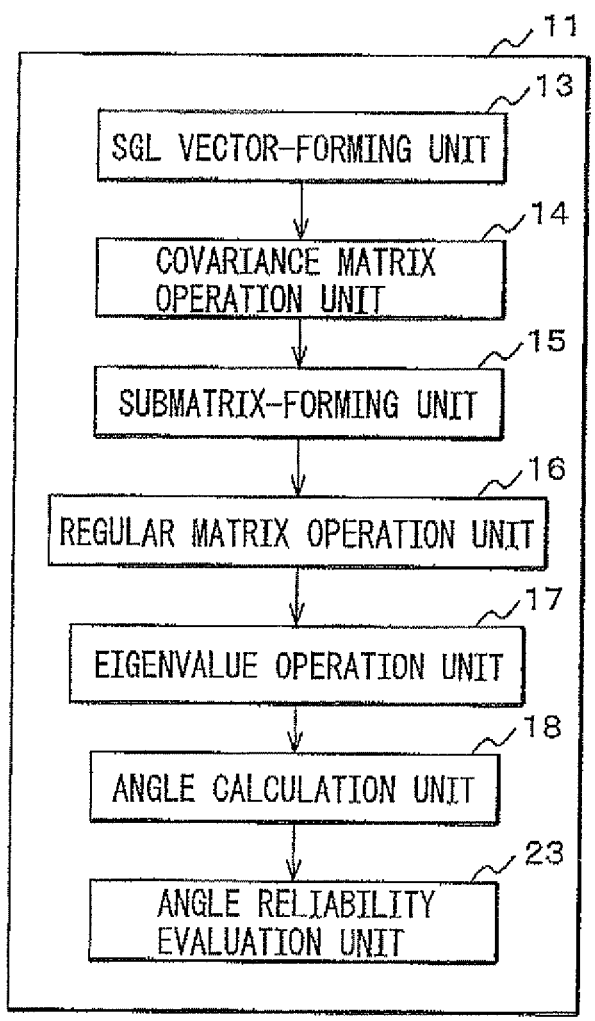
FIG. 13 is a diagram illustrating the constitution of the angle detecting unit in the radar device according to an embodiment 4 of the invention.

FIG. 13 is a diagram illustrating the constitution of the angle detecting unit in the radar device according to the embodiment 4 of the invention. The angle detecting unit of the embodiment 4 includes an angle reliability evaluation unit 23 for verifying the reliability of angle depending upon the magnitude of the eigenvalue in addition to the angle detecting unit 11 of the embodiment 1.

Next, described below is a method of examining the angle reliability with the angle reliability evaluation unit in the angle detecting unit of the radar device of the embodiment 4. The reliability evaluation method of the embodiment 4 is characterized by that the reliability is judged whether the magnitude of the eigenvalue is within a range of a given threshold value.

Figure 14:
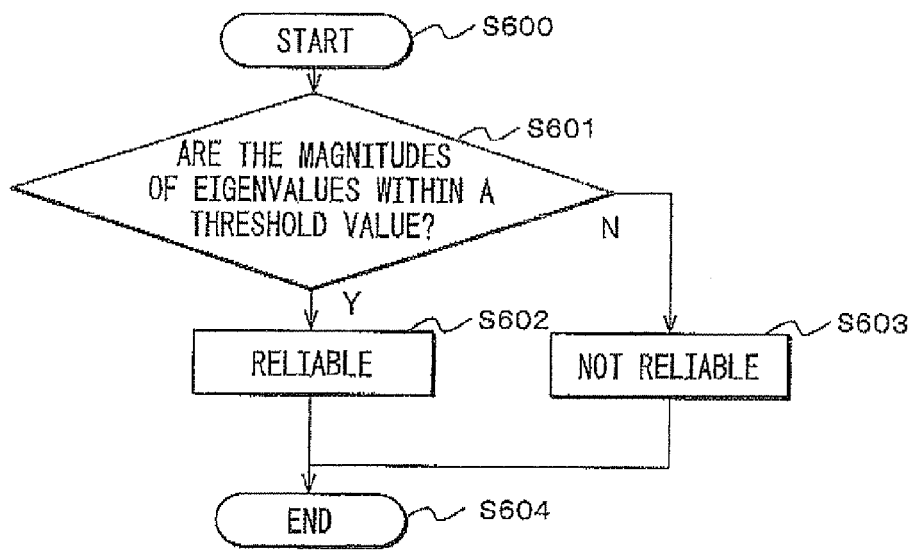
FIG. 14 is a flowchart of a method of verifying the reliability of angles according to the embodiment 4 of the invention.

FIG. 14 is a flowchart of a method of verifying the reliability of angle according to the embodiment 4 of the invention. At step S601, it is determined if the magnitude of the each eigenvalue of the regular matrix $\Psi$ is within the threshold value. If the magnitude of the eigenvalue is within the threshold value, it is determined at step S602 that the calculated angle is reliable. If the magnitude of the eigenvalue is not within the threshold value, it is determined at step S603 that the calculated angle is not reliable.

Embodiment 5

Next, the radar device according to an embodiment 5 of the invention will be described. The radar device of the embodiment 5 is equipped with an angle reliability evaluation unit for verifying the reliability of the angle depending upon the magnitude of the eigenvalue, and has a feature in that the reliability is validated based on an idea of the Pisarenko's method. Constitution of the angle detecting unit in the radar device of the embodiment 5 is the same as that of the embodiment 4, and is not described in detail.

Figure 15:
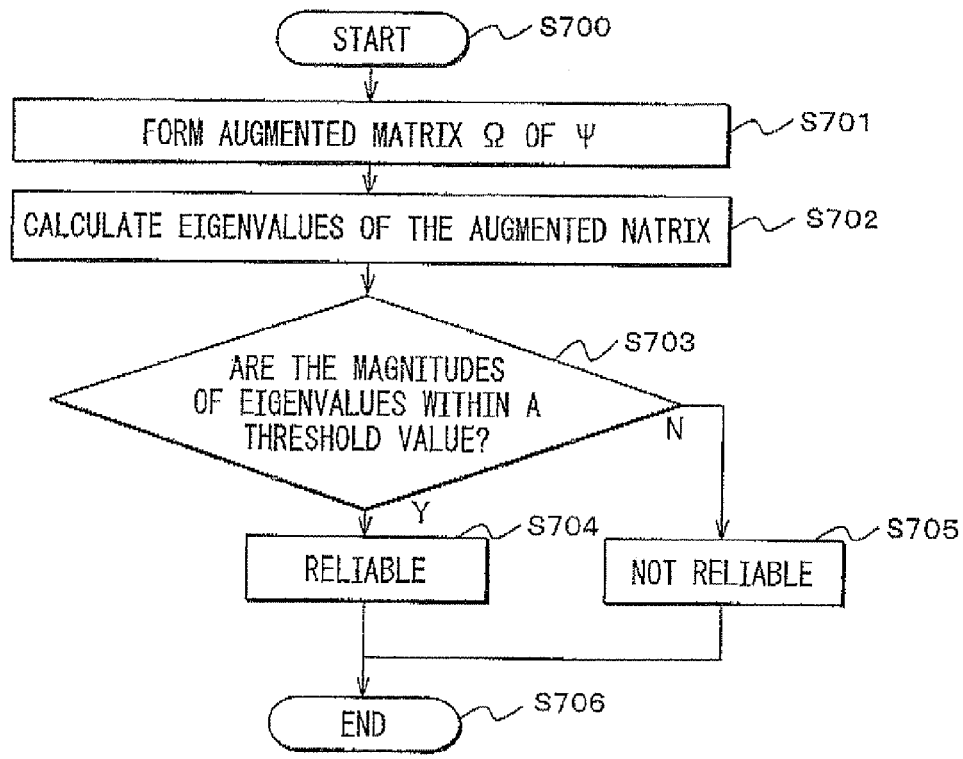
FIG. 15 is a flowchart of the method of verifying the reliability of angles according to an embodiment 5 of the invention.

Next, described below is a method of examining the angle reliability with the reliability evaluation unit in the angle detecting unit of the radar unit of the embodiment 5. FIG. 15 is a flowchart of the method of verifying the reliability of angle according to the embodiment 5. At step S701, an augmented matrix $\Omega$ of the regular matrix $\Psi$ is formed as described below. The Pisarenko's method is for evaluating the reliability based on the angles of a pair of solutions and the closeness of distance by utilizing such a nature that the two solutions that form a pair become repeated roots on a unit circle under an ideal condition on a Gaussian plane. Therefore, the number of solutions becomes twice as many as in the ordinary cases. This is, in many cases, conducted by the approaches that scan NULL on angular spectrum for finding incoming direction, and is applied to the ESPRIT method.

By taking an instance of the two-dimensional case, the equation according to the Pisarenko's method can be given as follows:

$$h(z) = \begin{bmatrix} 1 & z^{-1} \end{bmatrix} \begin{bmatrix} \phi_{11} & \phi_{12} \\ \phi_{21} & \phi_{22} \end{bmatrix} \begin{bmatrix} 1 \\ z \end{bmatrix} \quad (22)$$
$$= z^{-1}[\phi_{12}z^2 + (\phi_{11} + \phi_{22})z + \phi_{21}]$$

The above equation has a structure obviously different from the characteristic equation. Therefore, the matrix is augmented to prepare an equation having a structure equivalent to the above equation. Namely, the augmented matrix $\Omega$ is assumed to be as given below, $$\Omega = \begin{bmatrix} 0 & \phi_{11} & \phi_{12} \\ -a & \phi_{21} & \phi_{22} \\ -b & -c & 0 \end{bmatrix} \quad (23)$$

Then, the characteristic equation is found as follows:

$$f(\lambda) = \det[\lambda I - \Omega] = \det \begin{bmatrix} \lambda & -\phi_{11} & -\phi_{12} \\ a & \lambda - \phi_{21} & -\phi_{22} \\ b & c & \lambda \end{bmatrix} \quad (24)$$

-continued
$$= \lambda^3 - \lambda^2 \phi_{21} + c\lambda\phi_{22} + a\lambda\phi_{11} + b\phi_{11}\phi_{21} - ac\phi_{12} + b\lambda\phi_{12} - b\phi_{12}\phi_{21}$$

If a=c=−1 and b=0, then the characteristic equation is written as, $$f(\lambda) = \lambda^3 - [\lambda^2 \phi_{21} + \lambda(\phi_{22} + \phi_{11}) + \phi_{12}] \quad (25)$$
$$= \det\left[\begin{pmatrix} \lambda & 0 & 0 \\ -1 & \lambda & 0 \\ 0 & -1 & \lambda \end{pmatrix} - \begin{pmatrix} 0 & \phi_{11} & \phi_{12} \\ 0 & \phi_{21} & \phi_{22} \\ 0 & 0 & 0 \end{pmatrix}\right]$$

If the arrangement of coefficients and the order are modified, there is obtained an equation having the same constitution as h(z). Next, at step S702, the above equation is solved to calculate an eigenvalue. Thereafter, at step S703, it is determined if the magnitudes of the corresponding eigenvalues (usually evaluated as differences in the distance and in the angle) are within the threshold values. If the magnitudes of the corresponding eigenvalues are within the threshold values, it is determined at step S704 that the calculated angle data are reliable. If the magnitudes of the corresponding characteristic values are not within the threshold value, on the other hand, it is determined at step S705 that the calculated angle data are not reliable.

If the solution of the characteristic equation is $\lambda_1 > \lambda_2$, then the solution of the equation with the coefficients; reciprocal of $\lambda_1$ and $\lambda_2$ will be as follows:

$$f(x) = x^2 + \frac{x}{\lambda_2} + \frac{1}{\lambda_2} = 0 \Rightarrow x = -\frac{1}{2\lambda_1}\left(1 \pm \sqrt{1 - \frac{4\lambda_1^2}{\lambda_2}}\right) \quad (26)$$

If the interior of the radical sign can be approximated, then, $$x \approx -\frac{1}{2\lambda_1}\left[1 \pm \left(1 - \frac{2\lambda_1^2}{\lambda_2}\right)\right] = -\frac{1}{\lambda_1} + \frac{1}{\lambda_2}, -\frac{\lambda_1}{\lambda_2} \quad (27)$$

If attention is given to $\lambda_1 > \lambda_2$ between the above two solutions, then $1/\lambda_1 < 1/\lambda_2$. Therefore, the former one can be specifically used for verifying the validity of $\lambda_2$. That is, if $\lambda_2 = r_2 \cdot \exp(j\phi_2)$, then $1/\lambda_2 = (1/r_2) \cdot \exp(-j\phi_2)$. Therefore, the distance can be determined relying upon if the condition, $||\lambda_2| - |1/\lambda_2|| = |r_2 - 1/r_2| \leq$ threshold value of distance, is satisfied. The angle, on the other hand, can be determined relying upon if the condition, $|\arg(\lambda_2) - \arg(1/\lambda^*_2)| \leq$ threshold value of angle, is satisfied. Here, arg(z) is a phase of z. This is because, as described above, $\lambda_2$ if it is a true solution becomes a root on the unit circle and, therefore, $r_2 \approx 1/r_2 \approx 1$.

Embodiment 6

Next, the radar device according to an embodiment 6 of the invention will be described. The radar device of the embodiment 6 is equipped with an angle reliability evaluation unit for verifying the reliability of the angle depending upon the magnitude of the eigenvalue, and has a feature in that the reliability is validated by using an equation that has an inverse number of the eigenvalue as a solution. Constitution of the angle detecting unit in the radar device of the embodiment 6 is the same as that of the embodiment 4, and is not described in detail.

Figure 16:
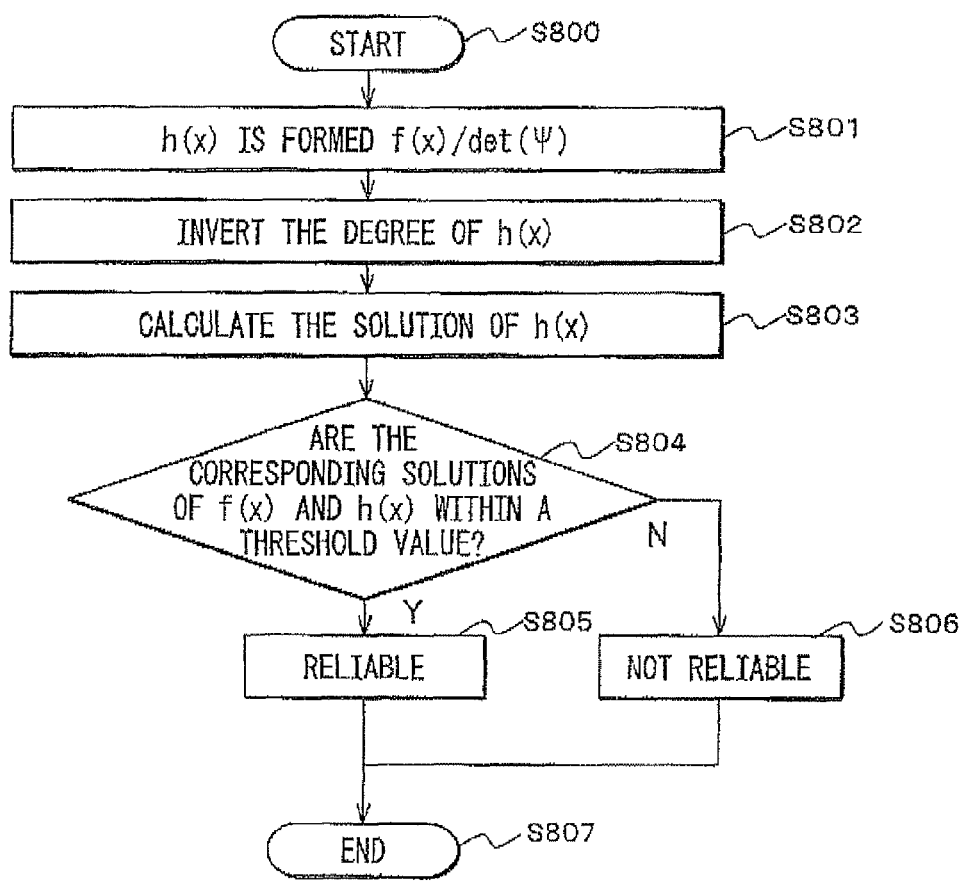
FIG. 16 is a flowchart of the method of verifying the reliability of angles according to an embodiment 6 of the invention.

Next, described below is a method of examining the angle reliability with the angle reliability evaluation unit in the angle detecting unit of the radar unit of the embodiment 6. FIG. 16 is a flowchart of the method of verifying the reliability of angle according to the embodiment 6. At step S801, first, an equation h(x) is formed as described below.

A characteristic equation concerning Ψ is as follows:

$$\Psi = \begin{bmatrix} \phi_{11} & \phi_{12} \\ \phi_{21} & \phi_{22} \end{bmatrix} \quad (28)$$

$$f(x) = |xI - \Psi| = \det\begin{bmatrix} x - \phi_{11} & -\phi_{12} \\ -\phi_{21} & x - \phi_{22} \end{bmatrix} \quad (29)$$
$$= (x - \phi_{11})(x - \phi_{22}) - \phi_{12}\phi_{21}$$
$$= x^2 - tr(\Psi)x + \det(\Psi) = 0$$

Next, an equation obtained by dividing f(x) by a determinant of the matrix Ψ as follows. The feature resides in that in establishing the characteristic equation, the value of determinant has previously been calculated.

$$h(x) = \frac{f(x)}{\det(\Psi)} \quad (30)$$

If the solutions of the characteristic equation are $\lambda_1$, $\lambda_2$, then h(x) is as follows:

$$h(x) = \frac{1}{\lambda_1 \lambda_2} x^2 - \left(\frac{\lambda_1 + \lambda_2}{\lambda_1 \lambda_2}\right) x + 1 \quad (31)$$

Next, at step S802, the degree of h(x) is inverted. That is, if h(x) is renewed by substituting the coefficient vectors of h(x) in a manner of inverting the relationship of ascending powers/descending powers of coefficients, then, $$h(x) = x^2 - \left(\frac{\lambda_1 + \lambda_2}{\lambda_1 \lambda_2}\right) x + \frac{1}{\lambda_1 \lambda_2} = \left(x - \frac{1}{\lambda_1}\right)\left(x - \frac{1}{\lambda_2}\right) \quad (32)$$

Thus, the equation becomes equivalent to an equation in which inverse numbers of the eigenvalues are the solutions. Next, at step S803, f(x) and h(x) are simultaneously solved. By using an inverse number of the solution of h(x), it is examined at step S804 whether the solutions are matched each other. Alternatively as in the embodiment 5, for all ns, the distance may be checked relying upon $||\lambda_n|-|1/\lambda_n||=|r_n-1/r_n|\leq$threshold value of distance and the angle may be checked relying upon $|arg(\lambda_n)-arg(1/\lambda^*_n)|\leq$threshold value of angle for the solution $\lambda_n = r_n \cdot \exp(j\phi_2)$ of f(x) and for the solution $1/\lambda_n = (1/r_n)\cdot\exp(-j\phi_2)$ of h(x).

If the solutions of f(x) and h(x) are matched, it is judged at step S805 that the calculated angle data are reliable. If the solutions of f(x) and h(x) are not matched, on the other hand, it is judged at step S806 that the calculated angle data are not reliable.

Embodiment 7

Next, the radar device according to an embodiment 7 of the invention will be described. The radar device of the embodiment 7 is equipped with an angle reliability evaluation unit for verifying the reliability of angle depending upon the magnitude of the eigenvalue, and has a feature in that the reliability is validated by using an equation that has an inverse number of the eigenvalue as a solution. Constitution of the angle detecting unit in the radar device of the embodiment 7 is the same as that of the embodiment 4, and is not described in detail.

Figure 17:
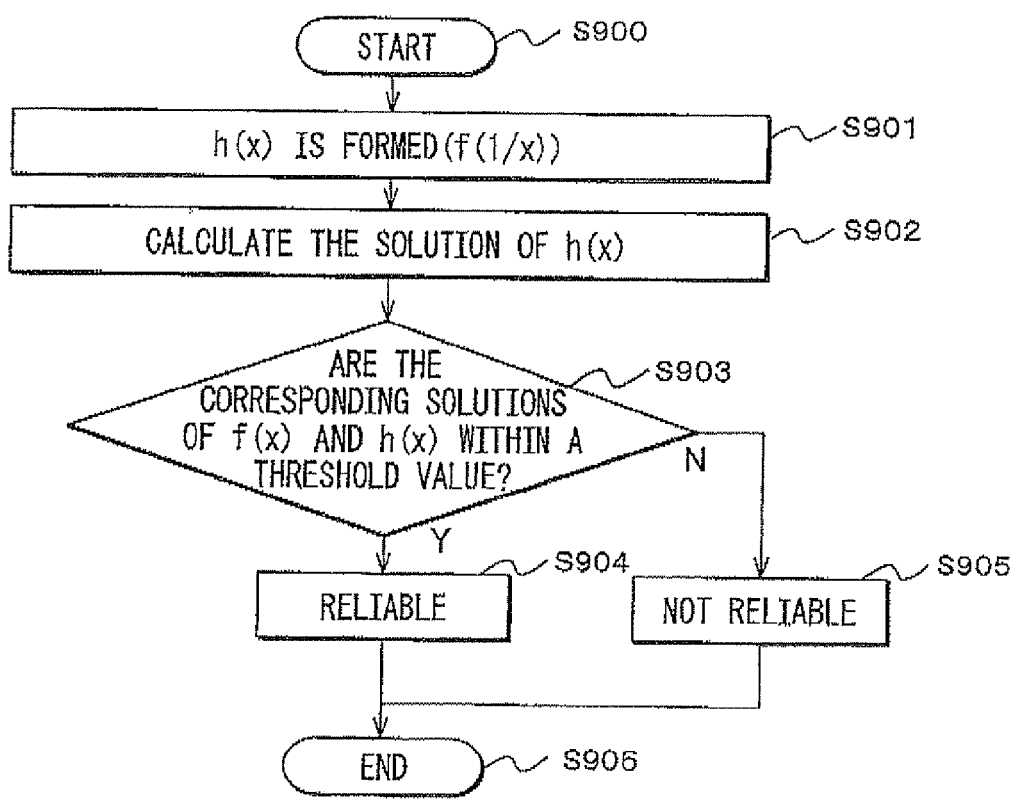
FIG. 17 is a flowchart of the method of verifying the reliability of angles according to an embodiment 7 of the invention.

Next, described below is a method of examining the angle reliability with the angle reliability evaluation unit in the angle detecting unit of the radar unit of the embodiment 7. FIG. 17 is a flowchart of the method of examining the angle reliability according to the embodiment 7. At step S901, first, h(x)=f(1/x) is formed. Subsequent steps S902 to 905 are the same as steps S803 to 806 of the embodiment 6, and are not described in detail.

As for the true solutions as described above, f(x) and f(1/x) have a common solution. Upon simultaneously solving f(x) and f(1/x), therefore, an inverse number of the solution of f(1/x) is picked up. If the solutions are matched, the solutions are regarded as true Solutions.

In the above description, the constituent elements of the diagramed radar device were generally described for their functions but do not necessarily have to be physically constituted as shown in the drawings.

Further, the processing functions executed by the constituent elements may be wholly or partly realized by the CPUs or by the programs that are analyzed and executed by the CPUs, or may be realized as hardwares of logic circuits.

What is claimed is:

1. A radar device comprising:
   a signal vector-forming unit configured to form signal vectors having elements of a number of N based on waves reflected from an object and received by using a plurality of receiving antennas of the number of N;
   a submatrix-forming unit configured to (i) calculate N×N covariance matrices based on the signal vectors having the elements of the number of N, (ii) extract N×(N−1) submatrices from the N×N covariance matrices, and (iii) form two of (N−1)th-dimensional submatrices $R_1$ and $R_2$ from the N×(N−1) submatrices;
   a regular matrix operation unit configured to calculate a regular matrix Ψ as $\Psi = R_1^{-1} * R_2$ from the two of (N−1)th-dimensional submatrices $R_1$ and $R_2$;
   an eigenvalue decomposition unit configured to calculate an eigenvalue $\exp(j\Phi_k)$ (k=1 to N−1) of the regular matrix Ψ; and
   an angle calculation unit configured to calculate an angle $\theta_k$ at where the object is present from phase $\theta_k = 2*\pi*(d/\lambda)*\sin(\theta_k)$ of the eigenvalue $\exp(j\phi_k)$, where d is a distance between antennas of a uniform linear array reception antenna, and λ is a wavelength of a center frequency of signals formed by an oscillator.

2. A radar device comprising:
   a signal vector-forming unit configured to form signal vectors of a number of k(k=1 to N−1) having elements of a number of N based on waves reflected from an object and received by using receiving antennas of the number of N;
   a submatrix-forming unit configured to form column vectors by arranging longitudinally each component of the signal vectors of the number of k having elements of the number of N and arranging the signal vectors of the number of k in row direction, and calculating two of M(M<N)th-dimensional submatrices $R_1$ and $R_2$ from the column vectors;

a regular matrix operation unit configured to calculate a regular matrix $\Psi$ as $\Psi=R_1^{-1}*R_2$ from the two of M(M<N)th-dimensional submatrices $R_1$ and $R_2$;

an eigenvalue decomposition unit configured to calculate an eigenvalue $\exp(j\Phi_k)$(k=1 to M(N<N) of the regular matrix $\Psi$; and an angle calculation unit configured to calculate an angle $\theta_k$ at where the object is present from phase $\Phi_k=2*\pi*(d/\lambda)*\sin(\theta_k)$ of the eigenvalue $\exp(j\theta_k)$, where d is the distance between antennas of the uniform linear array reception antenna, and $\lambda$ is the wavelength of a center frequency of signals formed by an oscillator.

3. The radar device according to claim 1, further comprising:

an evaluation function-forming unit configured to form an evaluation function $\epsilon(\alpha)$ using the submatrices $R_1$ and $R_2$ as $$\epsilon(\alpha)=\|R_1-\alpha R_2\|^2=\|(J_1 A)R_{xx}(I_3-\alpha\Phi^H)(J_1 A)_H+\sigma^2(I_3-\alpha K_3)\|^2$$

where $$J_1 = \begin{bmatrix} 1 & 0 & 0 & 0 \\ 0 & 1 & 0 & 0 \\ 0 & 0 & 1 & 0 \end{bmatrix}$$

$$A = \begin{bmatrix} 1 & 1 & 1 \\ \exp(j\phi_1) & \exp(j\phi_2) & \exp(j\phi_3) \\ \exp(j2\phi_1) & \exp(j2\phi_2) & \exp(j2\phi_3) \\ \exp(j3\phi_1) & \exp(j3\phi_2) & \exp(j3\phi_3) \end{bmatrix};$$

array response matrix

Rxx: a covariant matrix of a vector x including received signals $x_k$ (k=1 to 3) of a k-th incoming wave as a component, $$I_3 = \begin{bmatrix} 1 & 0 & 0 \\ 0 & 1 & 0 \\ 0 & 0 & 1 \end{bmatrix}$$

$$\Phi = \begin{bmatrix} \exp(j\phi_1) & 0 & 0 \\ 0 & \exp(j\phi_2) & 0 \\ 0 & 0 & \exp(j\phi_3) \end{bmatrix}$$

$\sigma$: (a mean noise power)$^{1/2}$ $$K_3 = \begin{bmatrix} 0 & 1 & 0 \\ 0 & 0 & 1 \\ 0 & 0 & 0 \end{bmatrix};$$

and a minimum value calculation unit configured to calculate a minimum value of the evaluation function, wherein the angle calculation unit calculates $\phi$ from $\alpha=\exp(j\phi)$ where the evaluation function becomes the minimum value, and calculates an angle $\theta$ at where the object is present from the calculated $\phi=2*\pi*(d/\lambda)*\sin(\theta)$.

4. The radar device according to claim 1, wherein the radar further comprises an angle reliability evaluation unit configured to evaluate the reliability of the calculated angle.

5. The radar device according to claim 2, wherein the radar further comprises an angle reliability evaluation unit configured to evaluate the reliability of the calculated angle.

* * * * *